(12) United States Patent
Müller-Rentz

(10) Patent No.: US 8,331,018 B2
(45) Date of Patent: Dec. 11, 2012

(54) OPTICAL SYSTEM FOR MERGING A FIRST AND A SECOND PARTIAL IMAGE BEAM, EACH PROCEEDING FROM A SPECIMEN, INTO A RESULTANT IMAGE BEAM

(75) Inventor: Arnold Müller-Rentz, Brechen (DE)

(73) Assignee: Leica Microsystems CMS GmbH, Wetzlar, DE (US)

(*) Notice: Subject to any disclaimer, the term of this patent is extended or adjusted under 35 U.S.C. 154(b) by 438 days.

(21) Appl. No.: 12/552,203

(22) Filed: Sep. 1, 2009

(65) Prior Publication Data

US 2010/0053719 A1  Mar. 4, 2010

(30) Foreign Application Priority Data

Sep. 4, 2008 (DE) .................. 10 2008 041 818

(51) Int. Cl.
*G02B 21/00* (2006.01)
*G02B 26/02* (2006.01)
(52) U.S. Cl. .................. 359/368; 359/236
(58) Field of Classification Search .......... 359/230, 359/234–236, 368, 381; 396/452, 493
See application file for complete search history.

(56) References Cited

U.S. PATENT DOCUMENTS

2004/0090671 A1   5/2004 Gilbert

FOREIGN PATENT DOCUMENTS

| DE | 680 950 | * | 8/1939 |
| DE | 938 271 | * | 8/1955 |
| EP | 1416308 | | 5/2004 |
| EP | 1416308 A1 | * | 5/2004 |

OTHER PUBLICATIONS

Office Action issued by the United States Patent and Trademark Office for U.S. Appl. No. 12/552,229 dated Mar. 11, 2011.
Reply filed on May 25, 2011 in response to the Office Action issued by the United States Patent and Trademark Office for U.S. Appl. No. 12/552,229 dated Mar. 11, 2011.

* cited by examiner

*Primary Examiner* — Stephone Allen
*Assistant Examiner* — Kimberly N Kakalec
(74) *Attorney, Agent, or Firm* — Schlee IP International, P.C.; Alexander R. Schlee

(57) ABSTRACT

An optical system is described for merging a first and a second partial image beam emanating from a specimen into a resultant image beam allowing modification of the areal proportion of the respective first or second partial image beam in the resultant image beam. A stop arrangement comprises at least a first and a second movable stop element each comprising at least one stop region adapted to be brought into a working position with the first or second partial image beam. Movably arranged connecting means for connecting the two stop elements are provided to modify the respective areal proportions of the partial image beams in the resultant image beam by movement of the connecting means.

12 Claims, 3 Drawing Sheets

OPTICAL SYSTEM FOR MERGING A FIRST AND A SECOND PARTIAL IMAGE BEAM, EACH PROCEEDING FROM A SPECIMEN, INTO A RESULTANT IMAGE BEAM

CROSS-REFERENCE TO RELATED APPLICATION

This application claims the priority of the German patent application DE 102008041818.8 having a filing date of Sep. 4, 2008. The entire content of this prior German patent application DE 102008041818.8 is herewith incorporated by reference.

BACKGROUND OF THE INVENTION

The present invention relates to an optical system for merging a first and a second partial image beam, each proceeding from a specimen, into a resultant image beam Such systems are used in particular in optical instruments for the examination of multiple prepared specimens such as, for example, comparison microscopes or comparison macroscopes.

When comparative examinations are carried out, the image of a first sample is usually compared with the image of a second sample. Comparison microscopes and comparison macroscopes in which partial image beams deriving from two objectives can be combined, by means of an optical system such as, for example, a comparison bridge, into one resultant image beam that can be viewed by the user, are known for carrying out such examinations. A variety of possibilities for depiction usually exist in this context, the resultant image being generated from the partial images by corresponding setting of stops; a mixing or superimposition of the respective partial images, or partial side-by-side placement or juxtaposition of portions of the partial images, is possible in this context.

An optical system of the generic kind is described in DE 1 623 228 A. The comparison bridge that is described comprises two movable stop arrangements in order to generate the image configurations described above. For this purpose, the user must operate with both hands, during the examination, rotary knobs located approximately at shoulder height; this proves to be uncomfortable and difficult to handle. In particular, the use of both hands during operation is necessary, so that no other activities can be performed simultaneously.

Other embodiments of comparison bridges that can be operated with one hand are known, for example from DE 938271 A. These comparison bridges have the disadvantage, however, that the various image configurations described above cannot be displayed. In particular, variable juxtaposition of subregions of an image, and displacement of the separating line, are not possible.

In order to improve the mechanical comparison bridges just described, motorized configurations have been developed that offer convenient usability for a plurality of different image configurations. These motorized embodiments have, however, the disadvantage of considerable additional design complexity and therefore also of increased acquisition and maintenance costs.

It is therefore desirable to provide an optical system according to the preamble of claim 1 that, with little design complexity and without motorization, can be operated by the user as easily and conveniently as possible and nevertheless enables a variety of image configurations.

The invention provides an optical system for merging a first and a second partial image beam into a resultant image beam in an optical instrument for the examination of prepared specimens, wherein the first and second partial image beam both emanate from the specimen, said optical system comprising a stop arrangement provided with: at least one first movable stop element for the first partial image beam; at least one second movable stop element for the first partial image beam; wherein said first and second stop elements each comprise at least one stop region adapted to be brought into a working position with the first or second partial image beam by movement of the respective first or second stop element in order to modify the areal proportion of the respective first or second partial image beam in the resultant image beam; and a movably arranged connecting means for connecting the two stop elements, said connecting means being adapted to modify the respective areal proportions of the partial image beams in the resultant image beam by movement of the connecting means.

An optical system according to the present invention for merging a first and a second partial image beam, each proceeding from a specimen, into a resultant image beam can be utilized in particular in an optical instrument for the (for example, forensic) examination of prepared specimens, for example a comparison microscope or a comparison macroscope. The optical system comprises a stop arrangement that comprises, for the first and for the second partial image beam, a respective movable stop element each having one or more stop regions, wherein at least one stop region can be brought, by movement of the stop element, into a working position with a partial image beam in order to modify the areal proportion of the respective partial image beam in the resultant image beam, the stop arrangement comprising a movably arranged connecting means for connecting the two stop elements. The respective areal proportions of the partial image beams in the resultant image beam are modifiable or settable by movement of the connecting means. A stop element is movable preferably within an image plane, for example an intermediate image plane, or into an image plane.

Advantages of the Invention

The solution according to the present invention offers the advantage that it is possible to make available an optical system of the generic kind that, with little design complexity, can be easily and conveniently operated by the user and enables multiple different image configurations. In the context of a comparative view of juxtaposed image segments of different specimens, the proportions of the individual partial images in the overall image can be modified by a movement, performable easily and also especially with one hand, of the mechanical connecting means. In this context the interface of the two partial images, for example a more or less distinct separation line or an overlap region, can be displaced within the image field, easily and especially with one hand, by the user. An overlap is also referred to hereinafter as a mixture or superimposition, the term "superimposition" not to be understood as interference. An easily operable and, in particular, unmotorized system that has a definite cost advantage with respect to motorized systems, but can be operated in similarly convenient fashion, can be provided.

Advantageously, the connecting means connects the two stop elements rigidly.

The stop arrangement can preferably be brought into a first position of the stop elements in which a first movement of the connecting means increases the areal proportion of the first partial image beam in the resultant image beam and decreases the areal proportion of the second partial image beam in the resultant image beam. Conversely, the first movement of the connecting means can also decrease the areal proportion of the first partial image beam in the resultant image beam and increase the areal proportion of the second partial image beam in the resultant image beam. This first position is used in particular for the so-called split image method, in which the resultant image is formed by juxtaposed, in particular complementary, image segments. Preferably provided for this purpose on both stop elements are stop regions that act as half-stops and can be brought into a working position with the respective partial image beam, and each block out a portion of the associated partial image beam. It is thus easy, by moving only the connecting means, to displace a separating line between the image segments in the resultant image (split image). It is moreover also possible for the separating line not to be visible in the region where the two partial images butt against each other, but instead for the two partial images to adjoin one another directly without a visible separating line. A partial overlap is provided as a further possibility. A first manually actuable adjusting means is preferably provided in order to bring about the first movement of the connecting means.

The first movement of the connecting means is advantageously a rotary movement about a first rotation axis. A rotary movement is a movement that can be made available in physically simple fashion. In this case in particular, the connecting means can be embodied as a bar. The first rotation axis advantageously extends perpendicular to a longitudinal axis of the connecting means, preferably between the stop elements.

It is advantageous if an eccentric arrangement or cam arrangement is provided in order to rotate the connecting means about the first rotation axis. An eccentric arrangement or cam arrangement is particularly easy to operate manually, and can be arranged almost arbitrarily along the connecting means in order to convey a rotary movement. It is also a good choice if a tensioning means such as, for example, a spring is provided in order to obtain a rotary bearing with zero-clearance preload.

According to a preferred embodiment, the stop arrangement can be brought into a second position of the stop elements in which the resultant image beam is formed by (in particular complete) mixing or superimposition of the two partial image beams. It is thus possible to make available an observation configuration in which the user can view both specimens in entirely or partly superimposed fashion, which is particularly suitable for specific examination methods. This configuration is referred to as a "mixed image."

It is likewise useful if the stop arrangement can be brought into a third and a fourth position of the stop elements in which the resultant image beam is formed only by the first and only by the second partial image beam, respectively. These image configurations, too, are particularly suitable for certain specimen examinations.

According to a particularly preferred embodiment, at least one of the movable stop elements is embodied as a rotatable stop disk whose rotation axis is arranged with a parallel spacing from the associated partial image beam path. It is thereby possible to form, within the stop disk area, different stop regions that can be brought into the beam path by rotating the stop disk. The configuration of the partial image can thus be modified by a simple rotary movement. In addition, a stop disk of this kind is particularly easy to manufacture and to install within the optical system. Preferably, each of the movable stop elements is embodied as a rotatable stop disk.

The stop arrangement can preferably be brought, by way of a second movement of the connecting means, into the first, second, third, or fourth position of the stop elements. Advantageously, a second manually actuable adjusting means is provided in order to bring about the second movement of the connecting means. The second movement can encompass, in particular, a rotation or a translating movement. The second movement of the connecting means is advantageously a rotary movement about a second rotation axis that preferably extends parallel to a longitudinal axis of the connecting means. Especially when both stop elements are embodied as rotatable stop disks, the image configuration can be modified by a rotation, about its longitudinal axis, of the connecting means that connects said disks. If, for example, four stop regions and therefore exactly four image configurations are made available on each stop disk, such a movement preferably encompasses 90 degrees. It is understood that the number of image configurations that can be made available is not limited to four. In the embodiment just described, a rotation of the connecting means about its longitudinal axis introduces the different stop regions into a working position with the partial image beams and thus makes available the different image configurations, while a rotation of the connecting means about its transverse axis modifies the areal proportions of the partial image beams in the first position of the stop elements. If, on the other hand, the stop elements are embodied as (in particular, arc-shaped) strips in which the stop regions forming an image configuration are located next to one another, a rotation about a transverse axis of the connecting means may be advantageous for changing the image configuration. If the stop elements encompass stop regions arranged in a longitudinal direction of the connecting means, a linear movement may be advantageous.

The influence of the first movement on the resultant image beam in the second, third, or fourth position depends on the configuration of the corresponding regions on the stop element and on the area of the image in the intermediate image plane, and is thus definable by the relevant skilled person in the context of design. It is possible to implement only one or both movement possibilities in an optical system. Be it noted that while the first and the second movement are in principle independent of one another, they can nevertheless also encompass the same movement depending on the configuration of the optical system. In the case of arc-shaped stop elements, for example, both the first and the second movement can be a rotary movement about the same axis. Accordingly, the first and the second adjusting means for carrying out the first and the second movement can also correspond.

If the rotation axis of the stop disk and the second rotation axis are coincident, components such as, for example, linkages, ratio conversion systems, etc. can be eliminated. The physical complexity of an optical system according to the present invention can thereby be further decreased.

A comparison microscope or comparison macroscope according to the present invention encompasses an optical system according to the present invention.

Further advantages and embodiments of the invention are evident from the description and the attached drawings.

It is understood that the features recited above and those yet to be explained below can be used not only in the respective combination indicated, but also in other combinations or in isolation, without leaving the context of the present invention.

The invention is depicted schematically, on the basis of exemplifying embodiments, in the drawings, and will be described in detail below with reference to the drawings.

DETAILED DESCRIPTION OF THE DRAWINGS

Figure 1:
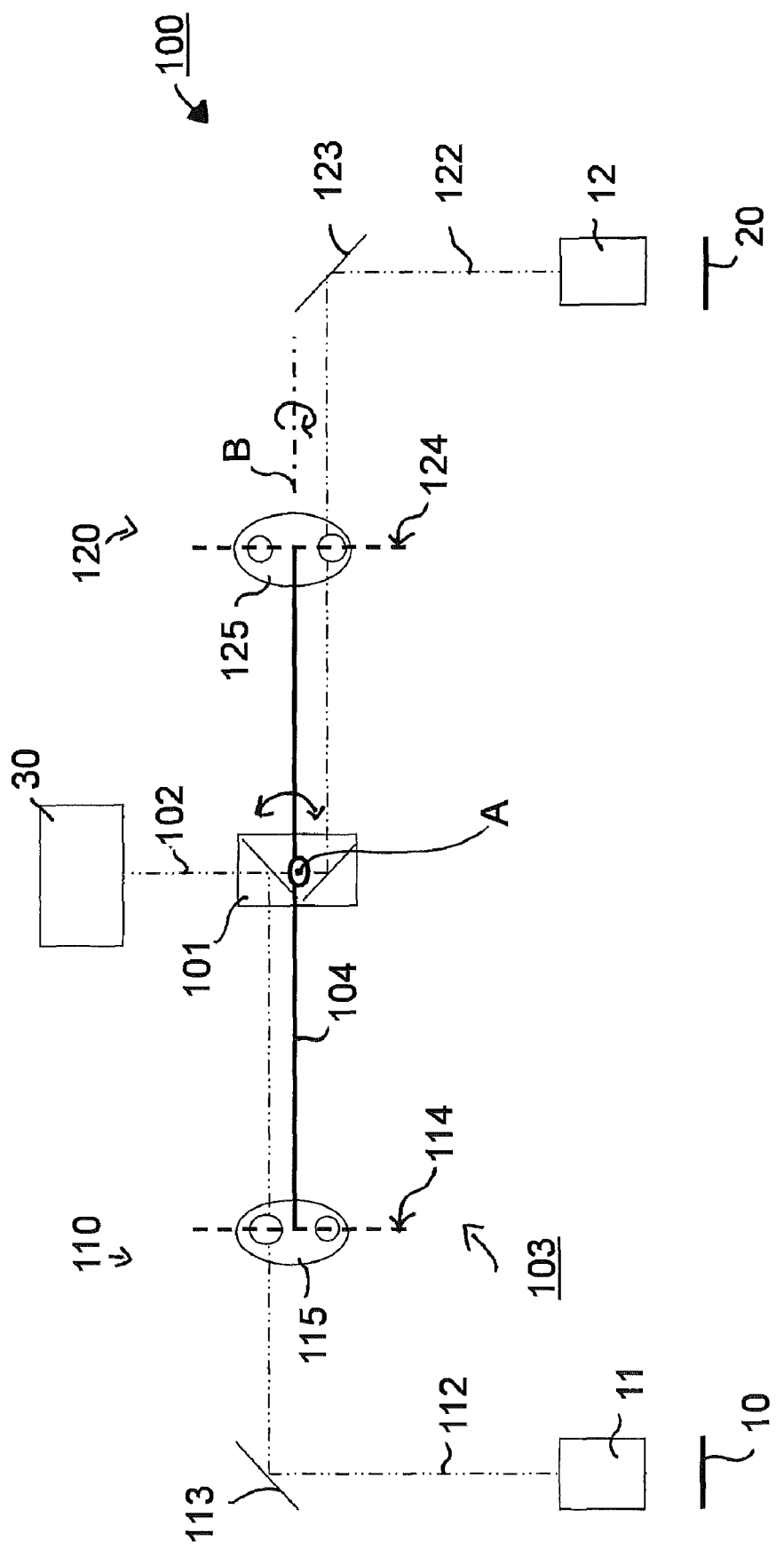
FIG. 1 is a side view schematically showing a preferred embodiment of the optical system according to the present invention.

In FIG. 1, a preferred embodiment of an optical system according to the present invention is schematically depicted and referenced by 100 in its entirety. The optical system is embodied as a comparison bridge 100. Optical system 100 serves for the observation of two specimens 10, 20 by merging partial image beams 112, 122, respectively proceeding therefrom, into one resultant image beam 102.

Comparison bridge 100 comprises a left arm 110 as well as a right arm 120. Located on each of the two arms is a respective objective 11, 12 that couples the respective partial image beam 112, 122 into comparison bridge 100. The two partial image beams 112 and 122 are merged, in an optical mixing member embodied here as splitter prism 101, into resultant image beam 102, and coupled into an optical tube 30 mounted on comparison bridge 100. The optical tube serves, in known fashion, to couple the resultant image beam alternatively or simultaneously into eyepieces, cameras, etc.

The two objectives 11, 12 and optical tube 30 are usually replaceable or removable elements that are detachably connected to comparison bridge 100. An objective turret or other functionally corresponding elements can also be provided instead of objectives 11, 12. Comparison bridge 100, together with objectives 11, 12 and optical tube 30, represents a comparison microscope or comparison macroscope. Within comparison bridge 100, left partial image beam 112 is deflected via a deflection element embodied here as mirror 113. Right partial image beam 122 is likewise deflected via a deflection element embodied here as mirror 123, so that the two partial image beams arrive at prism 101 horizontally and in parallel offset fashion.

Comparison bridge 100 comprises a stop arrangement 103 for making available desired image configurations. Stop arrangement 103 comprises for this purpose a first movable stop element 115 that is arranged in an intermediate image plane 114 of left partial image beam 112, and a second movable stop element 125 that is arranged in an intermediate image plane 124 of right partial image plane 122. Stop elements 115 and 125 are illustrated in slightly perspective fashion in the Figure for better comprehension, but lie in the respective image plane, i.e. perpendicular to the plane of the drawing. Stop elements 115 and 125 are connected by means of a connecting means embodied here as bar 104.

In the embodiment depicted, stop arrangement 103 is mounted rotatably about a first rotation axis A that extends along a transverse axis of bar 104, perpendicular to the plane of the drawing, substantially centeredly through prism 101. Stop arrangement 103 is furthermore rotatable about a second axis B that extends along the longitudinal axis of bar 104. Stop elements 115 and 125 are embodied as rotatable stop disks whose rotation axes are coincident with the longitudinal axis of bar 104 and thus with rotation axis B of stop arrangement 103. The physical configuration of the stop elements is depicted more specifically in FIG. 2.

In the embodiment of the optical system according to the present invention that is depicted, by rotating stop arrangement 103 about rotation axis A it is possible to modify the proportions of resultant image beam 102 deriving from partial images 112 and 122. This is done by considering that stop arrangement 103 is located in a first position of the stop elements in which, by means of correspondingly configured regions in stop elements 115, 125, a split image is generated by the fact that portions of the partial images are blanked out, and the parts allowed to pass through, arranged next to one another, produce the resultant image. In the resultant image, for example, one half of specimen 10 and one half of specimen 20 are therefore visible simultaneously next to one another. It is understood that spacing of the two halves apart from one another with a detectable separation line, or even an overlap, can likewise be stipulated in terms of design.

The proportions of the respective partial images in the resultant image can be modified by rotating or tilting stop arrangement 103 about rotation axis A. In the configuration shown, for example, by rotating stop arrangement 103 counter-clockwise the proportion of the image of first specimen 10 in the resultant image can be increased, while simultaneously the proportion of second specimen 20 in the resultant image is decreased. The correlation between movement and image change is predefined by the configuration of stop elements 115, 125, depicted in more detail in FIG. 2, and can thus be selected by the skilled person when configuring the comparison bridge.

A rotation of stop arrangement 103 about rotation axis B can introduce stop arrangement 103 not only into the first position just described, in which image portions of both specimens are displayed next to one another, but also into further positions in which a complete superimposition or mixing of the images of the two specimens, or display of only the right or only the left specimen, is possible.

Figure 2:
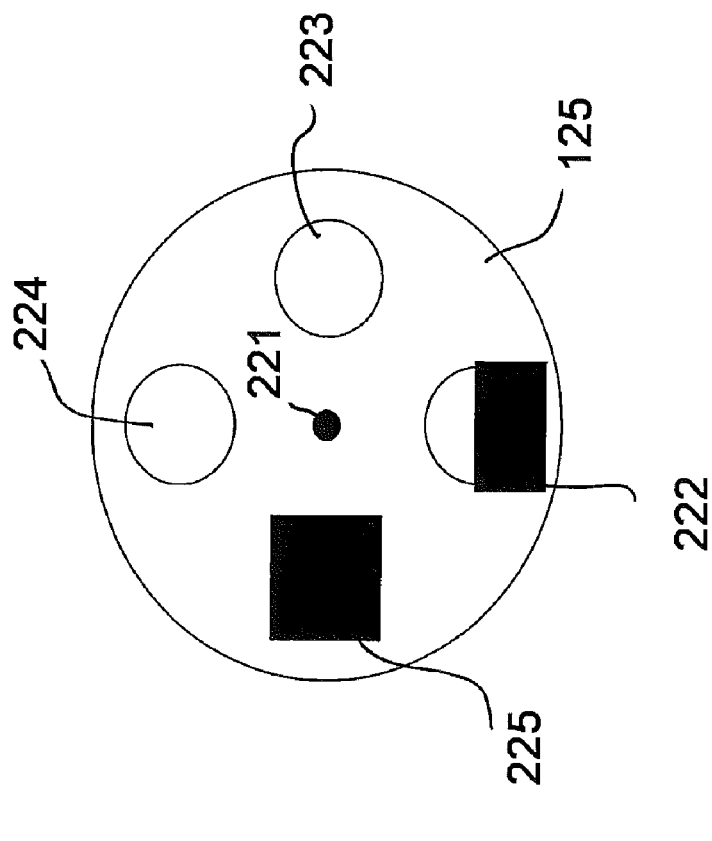
FIG. 2 is a schematic plan view of the two stop elements of FIG. 1 arranged in the image plane of the partial image beams.
Figure 2:
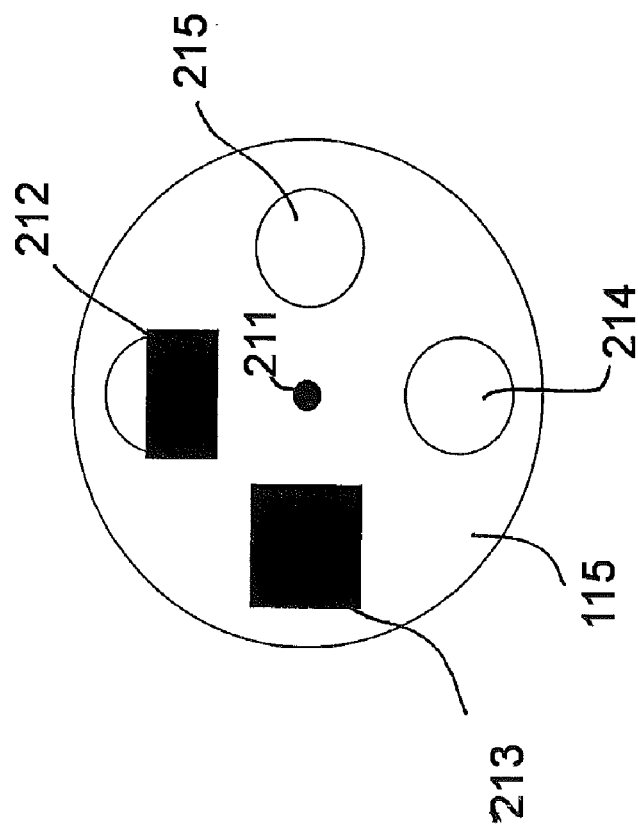

FIG. 2 depicts left stop element 115 and right stop element 125 of stop arrangement 103 of FIG. 1 in a plan view. The observation point is located on rotation axis A, so that stop elements 115 and 125 are being viewed along rod 104 that connects them. The two stop elements 115 and 125 are constructed in such a way that by their coaction, a plurality of advantageous image configurations can be made available. The two stop elements are each rotatably mounted about a respective rotation axis 211, 221. In addition, the two stop elements comprise various stop regions 212 to 215 and 222 to 225 that can be introduced into the respective partial image beam paths. Stop regions 212 to 215 and 222 to 225 thus actually constitute the optically effective stops. Stop regions 212 to 215 and 222 to 225 are in part configured differently.

In order to generate a desired image configuration, stop elements 115, 125 can together be moved (in the present case, rotated) by means of connecting means 104 in order to introduce the desired stop regions into the respective beam path. In the depiction shown, left partial image beam 112 runs above rotation axis 211, whereas right partial image beam 122 runs below rotation axis 221. The respectively coacting stop regions are thus, in the illustration, located on the stop elements with a 180-degree offset; in the configurations depicted, it is specifically stop regions 212 and 222 that are located in the respective beam path, this being referred to as the first position (split image). The percentage-based or areal proportion of the respective partial images in the resultant image can be modified by means of a rotation (described with reference to FIG. 1) of the stop arrangement about rotation axis A.

A rotation of stop arrangement 103 about rotation axis B into what is designated as the second position (mixed image) causes stop regions 214 and 224, which are embodied as openings, to be introduced into the respective partial image beam paths, the resultant image being a mixture or superimposition of the two partial images.

A movement of the stop arrangement into the third position (complete right image) or fourth position (complete left image) causes stop regions 213 and 223, and 215 and 225, respectively, to be introduced into the respective partial image beam paths, with the result that only the right and only the left partial image, respectively, appears in the resultant image. For that purpose, stop regions 213 and 225 are embodied as solid stops, and stop regions 215 and 223 as openings.

Figure 3:
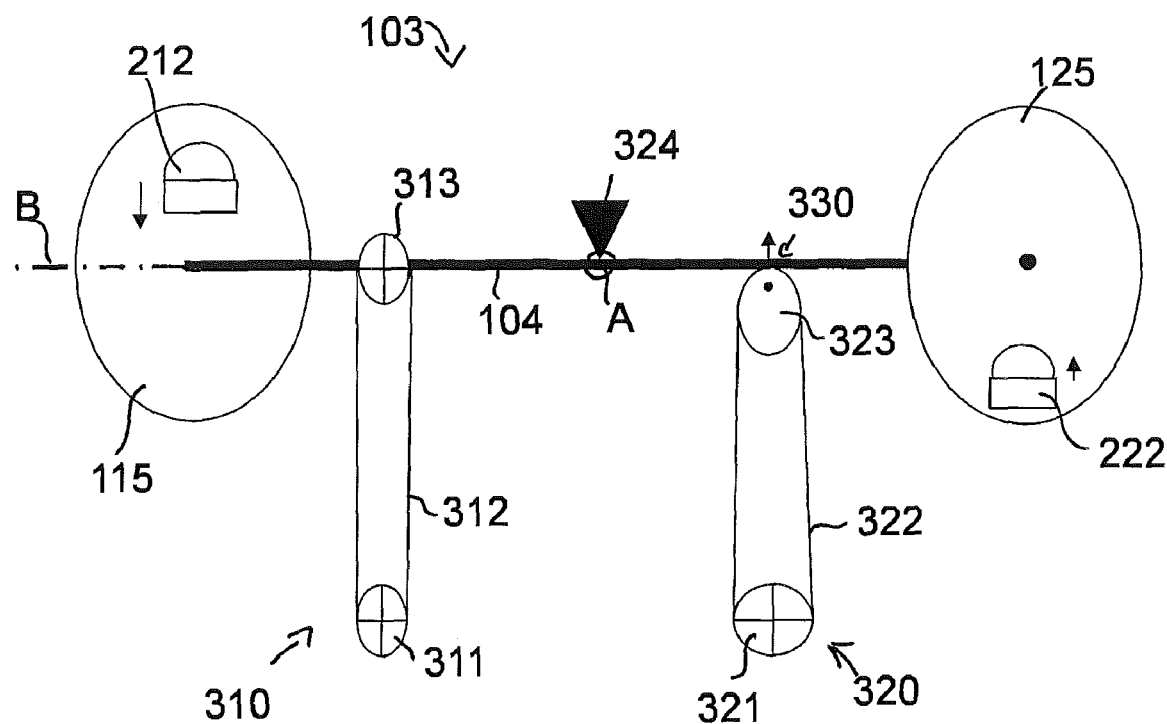
FIG. 3 is a perspective side view showing a stop arrangement of FIG. 1 together with two actuation devices for moving them.

FIG. 3 schematically depicts stop arrangement 103 of FIG. 1 in a perspective side view, together with two drive devices for moving the stop arrangement.

A actuation device 310 is provided for rotating stop arrangement 103 about rotation axis B. Actuation device 310 is embodied as a pulling-means drive, and comprises a first shaft 311 and a second shaft 313, and a pulling means 312 looping around the two shafts 311 and 313. Second shaft 313 is connected nonrotatably to bar 104. A linkage or the like can also be provided in order to transfer the rotary movement, or bar 104 can itself serve as second shaft 313. Stop arrangement 103 can be introduced into one of the four previously described positions of the stop elements by a rotation of first shaft 311 that is connected, for example, to a rotary knob. Advantageously, this movement can be performed by the user with one hand, thereby substantially simplifying operation of the comparison bridge.

A further actuation device 320 is provided for rotating stop arrangement 103 about rotation axis A, in order to modify the proportion of the partial images in the overall image or the location of the separation line. For that purpose, actuation device 320 is likewise embodied as a pulling-means drive having a first shaft 321 and a second shaft 323 and a pulling means 322 looping around the two shafts 321, 323. Actuation device 320 is embodied as an eccentric arrangement, and coacts with a bearing 324 in order to rotate or tilt stop arrangement 103. Shaft 321 can once again be operated or rotated by the operator with one hand, for example by means of a rotary knob, with the result that the second shaft, embodied in elliptical or cam-like fashion, raises or lowers stop arrangement 103 in a region 330 and thereby rotates it about axis A.

With shafts 321 and 323 in the position shown, a rotation of first shaft 321 produces a rotation of second shaft 323 in the same direction, and thus a counter-clockwise rotation of stop arrangement 103. Stop element 125 and thus stop region 222 are thereby displaced upward, whereas stop element 115 and thus stop region 212 are, conversely, displaced downward. The percentage-based or areal proportion of the left half-image in the resultant image is thereby increased, while the percentage-based or areal proportion of the right partial image in the resultant image is decreased. In this fashion, the separating line can be displaced within the resultant image.

The configuration according to the present invention of the optical system makes it possible to make available actuation devices that enable simple and, in particular, one-handed adjustment. This yields the advantages already discussed. The actuation devices can be embodied, in particular, as pulling-means drives utilizing V-belts, toothed belts, chains, etc.

The invention provides an optical system for merging a first and a second partial image beam into a resultant image beam, which system can be used with advantage in all kinds of comparative examinations. It permits simple and convenient operation which is possible, in particular, manually and with one hand. The proposed preferred embodiment is operable in particularly ergonomic and functional fashion, since one-handed operation allows simultaneous operation of other microscope or macroscope functions using the free hand. The invention can be implemented in unmotorized and comparatively economical fashion, and can nevertheless make available all the image configurations desired by the user.

List of Component Parts

A, B Rotation axis
10, 20 Specimen
11, 12 Objective
30 Tube
100 Comparison bridge
101 Beam splitter prism
102 Resultant image beam
103 Stop arrangement
104 Bar (connecting means)
110, 120 Arm
112, 122 Partial image beam
113, 123 Mirror
114, 124 Intermediate image plane
115, 125 Stop disk (stop element)
211, 221 Rotation axis
212-215 Stop region
222-225 Stop region
310, 320 Pulling-means drive (adjusting means)
311, 321 First shaft
312, 322 Pulling means
313, 323 Second shaft
324 Bearing

What is claimed is:

1. An optical system for merging a first and a second partial image beam into a resultant image beam in an optical instrument, wherein the first and second partial image beam both emanate from a specimen, said optical system comprising a stop arrangement provided with:
at least one first movable stop element for the first partial image beam;
at least one second movable stop element for the second partial image beam; wherein
said first and second stop elements each comprise at least one stop region adapted to be brought into a working position with the first or second partial image beam by movement of the respective first or second stop element in order to modify the areal proportion of the respective first or second partial image beam in the resultant image beam; and
a movably arranged connecting element for connecting and moving the two stop elements; wherein
the stop arrangement is adapted to be brought by a first movement into a first set of first and second configurations in that the first and the second stop element assume a respective first position and wherein a rotary movement of the connecting element in this first configuration around a first axis of rotation increases the areal proportion of the first partial image beam in the resultant image beam and decreases the areal proportion of the second partial image beam in the resultant image beam; and
the stop arrangement can be brought by a second movement that is a rotation of the connecting element about a second axis of rotation into a second set of first, second, third, and fourth configurations of the connecting element bringing the stop elements into the first, second, third, and fourth positions, respectively.

2. The optical system according to claim 1, wherein the connecting element connects the two stop elements rigidly.

3. The optical system according to claim 1, further comprising a first manually operable adjusting mechanism for operating the rotary movement as a first movement of the connecting element.

4. The optical system according to claim 1, wherein the first axis of rotation extends perpendicular to a longitudinal axis of the connecting element between the stop elements.

5. The optical system according to claim 1, wherein an eccentric arrangement is provided in order to rotate the connecting element about the first axis of rotation.

6. The optical system according to claim 1, wherein the stop arrangement can be brought into a second configuration wherein the first and the second stop element assume a respective second position in which the resultant image beam is formed by mixing of the two partial image beams.

7. The optical system according to claim 1, wherein the stop arrangement can be brought into a third and a fourth configuration wherein the first and the second stop element assume a respective third and fourth position in which the resultant image beam is formed only by the first and only by the second partial image beam, respectively.

8. The optical system according to claim 1, wherein at least one of the movable stop elements is a rotatable stop disk having an axis of rotation that extends in parallel to and offset by a spacing from the associated partial image beam path.

9. The optical system according to claim 8, wherein the second movement of the connecting element is a rotation about a second axis of rotation and the axis of rotation of the at least one stop disk and the second axis of rotation coincide.

10. The optical system according to claim 1, further comprising a second manually operable adjusting mechanism operating the second movement of the connecting element.

11. The optical system according to claim 1, wherein the second axis of rotation extends parallel to a longitudinal axis of the connecting element.

12. A comparison microscope or comparison macroscope encompassing an optical system according to claim 1.

* * * * *